US006917902B2

(12) United States Patent
Alexander

(10) Patent No.: US 6,917,902 B2
(45) Date of Patent: Jul. 12, 2005

(54) SYSTEM AND METHOD FOR PROCESSING MONITORING DATA USING DATA PROFILES

(75) Inventor: Bruce Alexander, Poulsbo, WA (US)

(73) Assignee: Vigilos, Inc., Seattle, WA (US)

( * ) Notice: Subject to any disclaimer, the term of this patent is extended or adjusted under 35 U.S.C. 154(b) by 0 days.

(21) Appl. No.: 10/377,913

(22) Filed: Feb. 28, 2003

(65) Prior Publication Data

US 2003/0167153 A1 Sep. 4, 2003

Related U.S. Application Data

(60) Provisional application No. 60/361,416, filed on Mar. 1, 2002.

(51) Int. Cl.[7] ............................................... G06F 15/00
(52) U.S. Cl. ...................................... 702/189; 382/118
(58) Field of Search ........................................ 702/189

(56) References Cited

U.S. PATENT DOCUMENTS

| | | | |
|---|---|---|---|
| 4,216,375 A | 8/1980 | Ulch et al. | |
| 4,218,690 A | 8/1980 | Ulch et al. | |
| 4,581,634 A | 4/1986 | Williams | |
| 4,714,995 A | 12/1987 | Materna et al. | |

(Continued)

FOREIGN PATENT DOCUMENTS

| | | |
|---|---|---|
| EP | 0804031 A | 10/1997 |
| WO | WO 97/07486 A | 2/1997 |
| WO | WO 01/28251 | 4/2001 |

OTHER PUBLICATIONS

EyeCast.com Introduces SchoolCast services for School Safety Officials and Law Enforcement Agencies, Press Release dated Apr. 28, 1999.

EyeCast.com Adds 360–degree Continuous Pan Rotation Cameras to It's[sic] EyeView Service, Press Release dated Mar. 15, 1999.
Screen Printing from www.remotecams.com, "Take a Step Into the Future . . . ," printed Sep. 17, 1999.
EyeCast.com, "EyeCast secures deals . . . ," *Washington Business Journal*, Aug. 13–19, 1999, Tech Section, p. 16.
EyeCast.com Announces EyeView Control, Press Release dated Oct. 12, 1998.
EyeCast Announces EyeCapture Services, Press Release dated Jul. 8, 1998.
EyeCast.com, Inc., "Providing Live Interactive Video for Surveillance & Monitoring Over the Internet".
Axis Communications, publication entitled "Axis 200+ Web Camera".
Axis Communications, publication entitled "Axis 240 Camera Server".
Axis Communications, www.axis.se/products/cam_240/, "30 Frames/Second," printed Sep. 28, 1999.
Axis Communications, ww.axis.se/products/camera_servers/cam_app_sol.htm, "Network Cameras Applications and Solutions," printed Sep. 28, 1999.
Axis Communications, www.axis.se/products/camera_servers/cam_fb.html, "Features and Benefits," printed Sep. 28, 1999.

*Primary Examiner*—Bryan Bui
*Assistant Examiner*—Xiuqin Sun
(74) *Attorney, Agent, or Firm*—Christensen O'Connor Johnson Kindness PLLC

(57) ABSTRACT

A system and method for processing monitoring data utilizing data templates are provided. A monitoring system includes a server in communication with various monitoring devices, including biometric monitoring devices. The monitoring system obtains the monitoring device data and evaluates the data according to data profiles that define one or more data templates, one or more data rules, and one or more outputs associated with the evaluation of the data rules. The data profiles, data rules, and data templates may be generated, formatted and distributed via a central repository.

67 Claims, 7 Drawing Sheets

U.S. PATENT DOCUMENTS

| | | | |
|---|---|---|---|
| 4,721,954 A | 1/1988 | Mauch | |
| 4,816,658 A | 3/1989 | Khandwala et al. | |
| 4,837,568 A | 6/1989 | Snaper | |
| 4,839,640 A | 6/1989 | Ozer et al. | |
| 4,962,473 A | 10/1990 | Crain | |
| 4,998,279 A | 3/1991 | Weiss | |
| 5,097,505 A | 3/1992 | Weiss | |
| 5,210,873 A | 5/1993 | Gay et al. | |
| 5,367,624 A | 11/1994 | Cooper | |
| 5,475,375 A | 12/1995 | Barrett et al. | |
| 5,475,378 A | 12/1995 | Kaarsoo et al. | |
| 5,544,062 A | 8/1996 | Johnston, Jr. | |
| RE35,336 E | 9/1996 | Ulch et al. | |
| 5,600,368 A | 2/1997 | Matthews, III | |
| 5,614,890 A | 3/1997 | Fox | |
| 5,629,981 A | 5/1997 | Nerlikar | |
| 5,654,696 A | 8/1997 | Barrett et al. | |
| 5,678,039 A | 10/1997 | Hinks et al. | |
| 5,680,328 A | 10/1997 | Skorupski et al. | |
| 5,682,142 A | 10/1997 | Loosmore et al. | |
| 5,729,471 A | 3/1998 | Jain et al. | |
| 5,742,286 A | 4/1998 | Kung et al. | |
| 5,768,119 A | 6/1998 | Havekost et al. | |
| 5,821,855 A | 10/1998 | Lewis | |
| 5,870,733 A | 2/1999 | Bass et al. | |
| 5,879,163 A | 3/1999 | Brown et al. | |
| 5,903,455 A | 5/1999 | Sharpe, Jr. et al. | |
| 5,903,730 A | 5/1999 | Asai et al. | |
| 5,923,264 A | 7/1999 | Lavelle et al. | |
| 5,960,174 A | 9/1999 | Dew | |
| 6,064,723 A | 5/2000 | Cohn et al. | |
| 6,185,316 B1 * | 2/2001 | Buffam | 382/115 |
| 6,233,588 B1 | 5/2001 | Marchoili et al. | |
| 6,304,857 B1 | 10/2001 | Heindel et al. | |
| 6,311,210 B1 | 10/2001 | Foladare et al. | |
| 6,356,949 B1 | 3/2002 | Katsandres et al. | |
| 6,542,075 B2 * | 4/2003 | Barker et al. | 340/506 |
| 6,721,391 B2 * | 4/2004 | McClelland et al. | 378/57 |
| 2002/0019945 A1 | 2/2002 | Houston et al. | |
| 2002/0029263 A1 | 3/2002 | Toyoshima et al. | |
| 2002/0031230 A1 * | 3/2002 | Sweet et al. | 380/278 |
| 2002/0188854 A1 * | 12/2002 | Heaven et al. | 713/186 |

* cited by examiner

SYSTEM AND METHOD FOR PROCESSING MONITORING DATA USING DATA PROFILES

CROSS-REFERENCE TO RELATED APPLICATION

This application claims the benefit of U.S. Provisional Application No. 60/361,416, entitled SYSTEM AND METHOD FOR PROCESSING MONITORING DATA UTILIZING DATA TEMPLATES, and filed on Mar. 1, 2002. U.S. Provisional Application No. 60/361,416 is incorporated by reference herein.

FIELD OF THE INVENTION

In general, the present invention relates to data monitoring and data monitoring systems, and in particular, to a system and method for data monitoring utilizing data templates.

BACKGROUND OF THE INVENTION

Generally described, monitoring systems can be used to obtain information from a variety of monitoring devices corresponding to one or more elements within a premises, or group of premises. In a representative use, a security monitoring system may provide real-time data reflecting the current status of a monitored environment, such as a physical location within a given premises. For example, a security guard may use a computer terminal to obtain video data from a number of image capture devices in order to assess the status of a premises, or an area within the premises. Accordingly, many conventional security monitoring systems can assist users in evaluating whether a security breach, or other monitoring event, has occurred (e.g., whether there is an unauthorized presence within the premises). Further, some security monitoring systems, upon the detection of a defined condition, are operable to initiate a number of reactive measures. For example, the monitoring system may alert an appropriate authority, or notify one or more authorized users, upon the detection of a given condition.

Some monitoring systems, such as security monitoring devices, have begun to incorporate biometric data monitoring devices, such as fingerprint scanners, retinal scanners, or facial recognition devices as part of a monitoring process. Although biometric monitoring devices can potentially facilitate the identification of individuals, objects and/or events, many traditional monitoring systems have not incorporated various biometric monitoring devices as part of an integrated monitoring process. For example, most monitoring systems are not configured to process incoming biometric data from a variety of monitoring devices because the incoming data often requires separate processing rules or reference sources. Additionally, some incoming biometric data is incompatible with the typical reference sources and/or processing rules. Thus, the use of biometric identification devices as part of an overall monitoring process is still limited.

In addition to the lack of ability to integrate biometric data processing as part of a monitoring process, many traditional monitoring systems do not provide or support robust data sources required by the traditional biometric identification devices. One skilled in the relevant art will appreciate that biometric identification tools require the use of data templates and data rules that are used to process biometric sample data coming in from the monitoring devices. For example, a biometric facial recognition identification device searching for all known felons would have to maintain data templates including the face templates of all known felons. In one aspect, many closed monitoring systems cannot efficiently support various biometric identification devices because of the strain on computing device resources in maintaining large stores of biometric template data. In another aspect, a monitoring system may be unable to utilize an external data template source if the data is maintained in an incompatible format. Accordingly, monitoring systems cannot integrate potential external data sources because of data format incompatibility.

Thus, based on the above-described deficiencies in the prior art, there is a need for a system and method for centrally processing and distributing biometric data templates and data rules to one or more processing systems. Additionally, there is a need for a system and method for processing specific instances and types of biometric data.

SUMMARY OF THE INVENTION

A system and method for processing monitoring data utilizing data templates are provided. A monitoring system includes a server in communication with various monitoring devices, including biometric monitoring devices. The monitoring system obtains the monitoring device data and evaluates the data according to data profiles that define one or more data templates, one or more data rules, and one or more outputs associated with the evaluation of the data rules. The data profiles, data rules, and data templates may be generated, formatted and distributed via a central repository.

In accordance with an aspect of the present invention, a method for processing monitoring device data is provided. The method may be implemented in a system including a monitoring device generating data characteristic of an individual. In accordance with the present invention, a processing device obtains monitoring device data characteristic of an individual. The processing device associates at least one data profile corresponding to the monitoring device data. The data profile includes an identification of a data processing template, at least one processing rule and at least one action assessment corresponding to the processing of the data processing template and at least one processing rule. The processing device processes the monitoring device data according to the at least one data profile. The processing device also generates an action assessment corresponding to the processing of the monitoring device data to the at least one data profile.

In accordance with another aspect of the present invention, a system for processing monitoring device data is provided. The system includes at least one monitoring device generating monitoring device data characteristic of an individual. The system also includes a data profile repository maintaining data profiles for processing monitoring device data. The data profile includes an identification of a data processing template, at least one processing rule and at least one action assessment corresponding to the processing of the data processing template and at least one processing rule. The system further includes a data processing computing device for processing the monitoring device data according to at least one data profile and for generating an action assessment defined in the data profile.

In accordance with another aspect of the present invention, a method for processing monitoring device data is provided. The method may be implemented in a system including a monitoring device generating data characteristic of an individual and processing computing device for generating an action assessment. In accordance with the method, a processing device obtains monitoring device data characteristic of an individual. The processing device selects at least one data profile for processing the monitoring device data. The data profile includes an identification of a data processing template, at least one processing rule and at least one action assessment corresponding to the processing of the data processing template and at least one processing rule. The processing device processes the monitoring device data according to the at least one data profile. The processing device also determines an action assessment corresponding to the processing of the monitoring device data to the at least one data profile.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
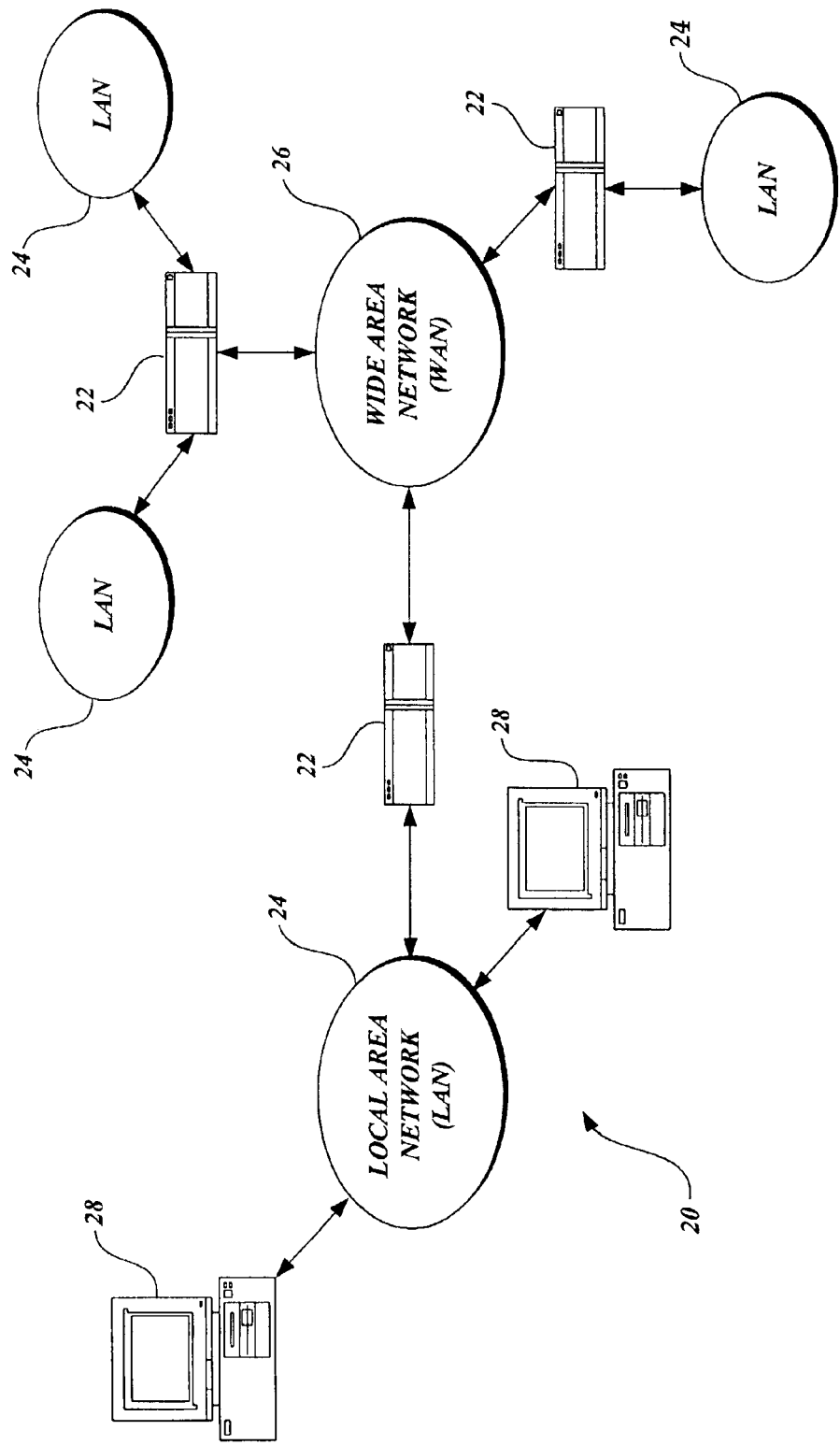
FIG. 1 is a block diagram of a representative portion of the Internet.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, where a plurality of local area networks ("LANs") 24 and a wide area network ("WAN") 26 are interconnected by routers 22. The routers 22 are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers 28 and other related electronic devices can be remotely connected to either the LANs 24 or the WAN 26 via a digital communications device, modem and temporary telephone, or a wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any Web server, the document is considered retrieved from the World Wide Web. Known to those skilled in the art, a Web server may also include facilities for storing and transmitting application programs, such as application programs written in the JAVA® programming language from Sun Microsystems, for execution on a remote computer. Likewise, a Web server may also include facilities for executing scripts and other application programs on the Web server itself.

A remote access user may retrieve hypertext documents from the World Wide Web via a Web browser program. A Web browser, such as Netscape's NAVIGATOR® or Microsoft's Internet Explorer, is a software application program for providing a user interface to the WWW. Upon request from the remote access user via the Web browser, the Web browser requests the desired hypertext document from the appropriate Web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the Web server, such as JAVA applets, for execution on the client computer. Finally, the WWW browser may include optional software components, called plug-ins, that run specialized functionality within the browser.

Figure 2:
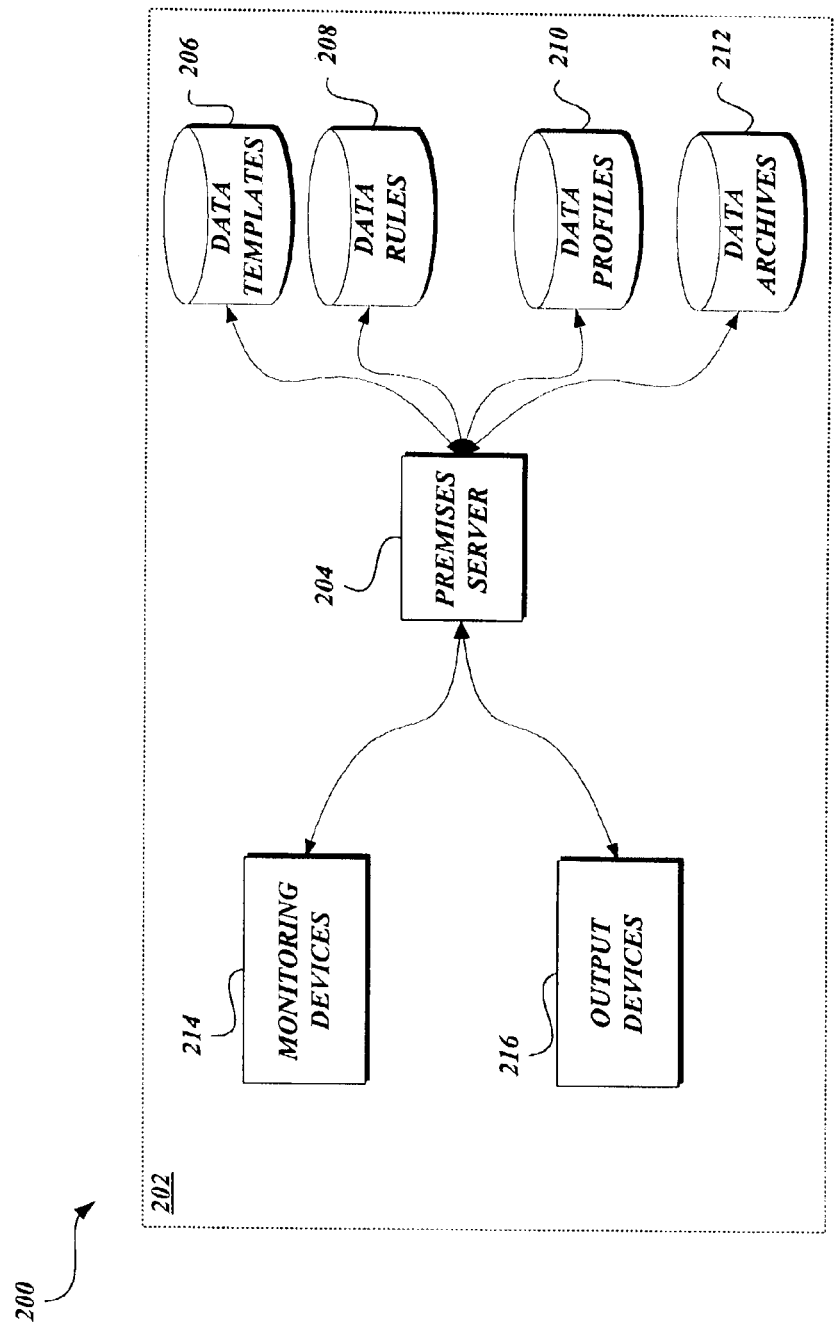
FIG. 2 is a block diagram of a biometric data processing system including a premises server and a plurality of data sources formed in accordance with the present invention.

Referring now to FIG. 2, an actual embodiment of a biometric data processing system 200 formed in accordance with the present invention will be described. The biometric data processing system 200 facilitates the processing of multiple biometric data inputs obtained from a number of monitoring devices located within one or more physical premises. One skilled in the art will appreciate that biometric data includes data associated with a particular individual that can be utilized to identify the individual. Biometric data includes, but is not limited, to facial recognition data, voice recognition data, fingerprint identification data, DNA recognition data, characteristic data, and the like.

The biometric data processing system processes the monitoring device data according to one or more processing rules, which can be system controlled or premises specific. Based on an evaluation of the inputs and a corresponding rule, the biometric data processing system 200 generates an action assessment. Accordingly, the system 200 can implement a system response, including the request for and processing of additional information. In an illustrative embodiment of the present invention, the biometric data processing system 200 may be utilized to generate security threat assessments based upon one or more identifications facilitated through biometric data inputs. However, one skilled in the relevant art will appreciate that the present invention is not limited to a security threat assessment system and that the disclosed embodiments are illustrative in nature.

With reference to FIG. 2, the biometric data processing system 200 includes a premises server 204 assigned to a premises 202 or group of premises 202. In an illustrative embodiment of the present invention, the premises server 204 is located physically proximate to the premises 202. Alternately, the premises server 204 may be remote, or physically separated from the premises 202. Moreover, although a single premises server 204 is illustrated in FIG. 2, any number of computing devices may be utilized to implement the present invention.

In accordance with an illustrative embodiment of the present invention, the premises server 204 is in communication with a number of data sources for facilitating communication with various monitoring and output devices, for evaluating premises specific rules, and/or for storing the inputted data for evaluation. More specifically, the premises server 204 is in communication with a data template database 206 operable to store and recall various biometric data templates that will be compared to inputted monitoring device samples. The premises server 204 is also in communication with a data rules database 208. The data rules database 208 is operable to recall one or more rules for evaluating the monitoring device data. As will be explained in further detail below, the premises rules database 208 can include programmatic and declarative rules for utilization by data processing systems, including but not limited to automata, neural networks, support vector machines ("SVM"), and the like. The data rules may be premises specific and/or system specified. The premises server 204 is further in communication with a data profiles database 210 that includes information operable to specify specific data rules and data templates that are utilized to process specific biometric data by the premises server 204. Further, the data profiles database 210 can specify one or more actions corresponding to the processing of the data rules and the monitoring device scripts. The premises server 204 can also include a data archives database 212 operable to store monitoring device data for processing. One skilled in the art will appreciate that premises server 204 may utilize a number of additional data sources, such as a device profile database, to communicate with the various monitoring and output devices. Further, one skilled in the relevant art will appreciate that the data templates database 206, the data rules database 208, the data profiles database 210, and the data archives database 212 may be physically remote from the premises server 204 and may be implemented as part of a distributed database network.

As also illustrated in FIG. 2, the premises server 204 can communicate with one or more monitoring devices 214 via a network connection. A more detailed description of a network for communicating with monitoring devices, including the use of one or more device servers, is found in co-pending U.S. application Ser. No. 10/117,557, entitled SYSTEM AND METHOD FOR MANAGING A DEVICE NETWORK and filed on Apr. 3, 2002, the disclosure of which is hereby incorporated by reference. In an illustrative embodiment, the monitoring devices 214 can include one or more biometric identification devices, including, but not limited to, voice identification devices, image capture devices (e.g., video motion capture and still image capture), microphones, fingerprint identification devices, retinal identification devices, DNA identification devices, and the like. The monitoring devices 214 can also include smoke, fire and carbon monoxide detectors. The monitoring devices 214 can further include door and window access detectors, glass break detectors, motion detectors, audio detectors, metal detectors, explosive detectors and/or infrared detectors. Still further, the monitoring devices 214 may include pressure-sensitive mats or planar surfaces. Still further, the monitoring devices 214 can include conventional panic buttons, global positioning satellite ("GPS") locators, other geographic locators, medical indicators, and vehicle information systems. The monitoring devices 214 can also be integrated with other existing information systems, such as inventory control systems, accounting systems, reservation systems, point-of-sale terminals/systems, and the like. It will be apparent to one skilled in the relevant art that additional or alternative monitoring devices 214 corresponding to a specific monitoring function may be practiced with the present invention.

The premises server 204 also communicates with one or more output devices 216. In an illustrative embodiment, the output devices 216 can include audio speakers, display or other audio/visual displays, or audio diaphragms for the projection of audio within targeted areas of a premises. The output devices 216 may also include electrical or electro-mechanical devices that allow the system to perform actions. The output devices 216 can include computer system interfaces, telephone interfaces, wireless interfaces, door and window locking mechanisms, aerosol sprayers, and the like. As will be readily understood by one skilled in the art, the type of output device is associated primarily with the type of action the biometric data processing system 200 generates. Accordingly, additional or alternative output devices 216 are considered to be within the scope of the present invention. In accordance with the present invention, the monitoring devices 214 and the output devices 216 can be linked together in a computer network environment in which multiple premises servers 202 work in parallel, sharing data and processes. Moreover, additional premises servers 202, monitoring devices 214, and output devices 216 may be joined modularly to provide extensibility to the system 200.

Figure 3:
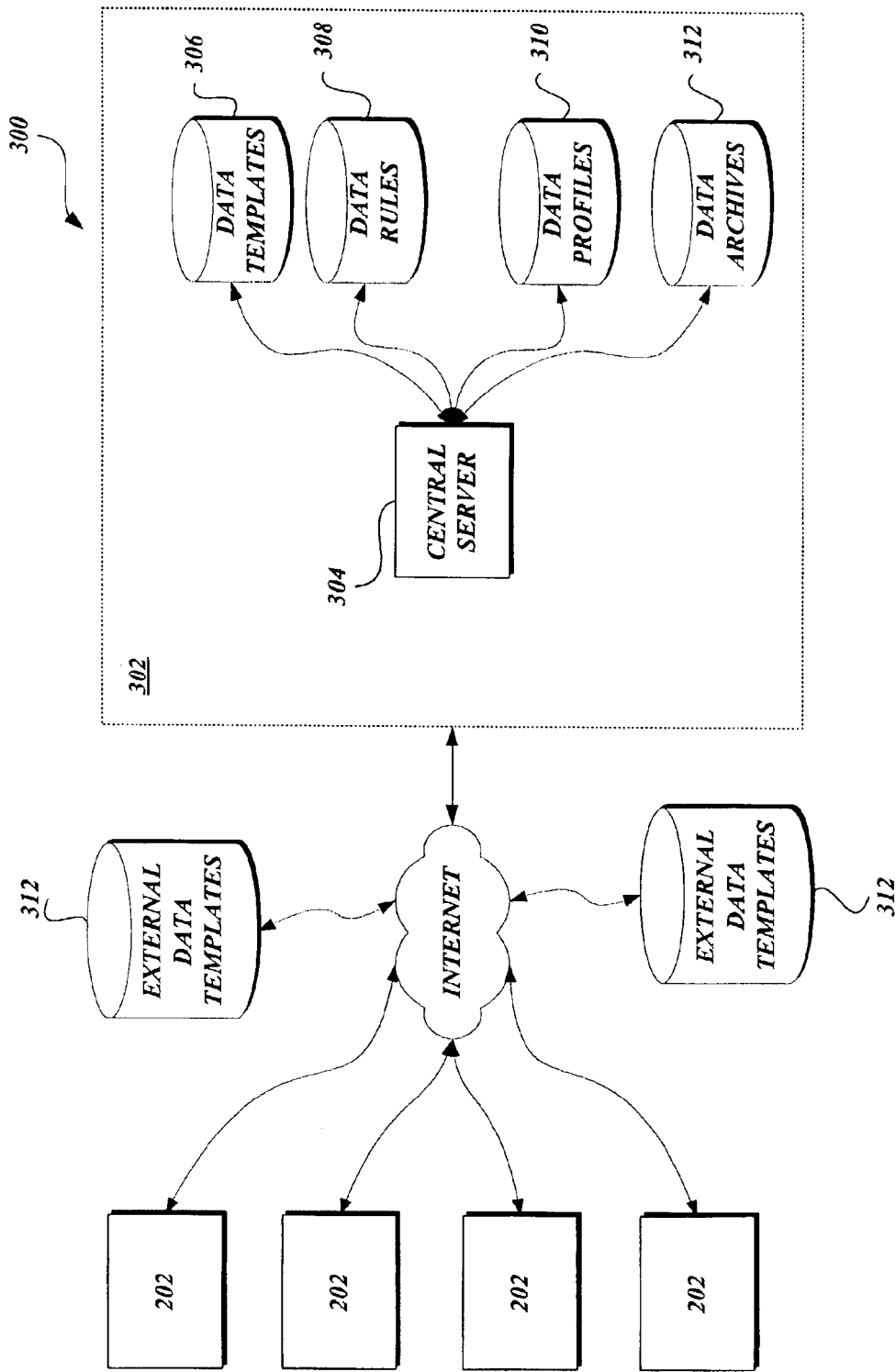
FIG. 3 is a block diagram illustrative of a biometric data processing system including a central processing server and one or more external data sources formed in accordance with the present invention.

Turning now to FIG. 3, an expanded embodiment of the present invention will be explained. In accordance with this embodiment, a biometric data processing system 300 includes a number of premises 202 and premises servers 204 that operate as described with respect to FIG. 2. Each of these premises 202 communicates to a central processing facility 302 that includes at least one central processing server 304. In an illustrative embodiment of the present invention, the individual premises 202 can communicate via global communication network such as the Internet 20, or alternatively via private communication networks and/or communication lines.

Similar to the premises server 204, the central processing server 304 is in communication with a number of data sources to facilitate processing incoming monitoring device data from the premises 202 and communicating with various monitoring devices within each individual premises 202. More specifically, the central server 304 includes a data templates database 306, a data rules database 308, a data profiles database 310, and a data archives database 312. In an illustrative embodiment of the present invention, the central processing server 304 data sources have similar functions to the data templates database 206, data rules database 208, data profiles database 210, and data archive database 212 (FIG. 2) and are operable to add a second data processing layer to the biometric data processing system 300. More specifically, the data templates database 306 is operable to store and recall data templates for processing monitoring device data. The data rules database 308 is operable to provide rules for processing premises monitoring device-specific data.

In an illustrative embodiment of the present invention, the data rules database 308 may maintain individually customized rules for each premises 202 or a set of rules applicable to a set of premises. The data profiles database 310 is operable to specify data templates and data rules for various monitoring device data. The data archives database 312 may be utilized to store various monitoring device data for processing. Similar to the premises databases, the central server databases may be physically proximate to the central server 304, or may be remote or physically separate from the central server 304 and implemented as part of a distributed database system.

The biometric data processing system 300 can also include one or more external data templates 314, operable to supply additional data template information to the central processing server 304. In an illustrative embodiment of the present invention, the external data templates 314 can include law enforcement databases, governmental databases, international databases, internal company databases, third-party commercial databases, and the like. In a similar manner, additional external data sources may also provide one or more data profiles and/or data rules. For example, a particular data source may provide a number of data profiles as well as the data rules and data templates referred to in the data profiles. Alternatively, some external data sources may provide only additional data rules or data profiles.

With continued reference to FIG. 3, in accordance with this embodiment of the present invention, the premises server 204 can obtain and process monitoring device data. As part of the processing, the premises server 204 can transmit the monitoring device data and any processing results to the central processing server 204. The central server can obtain the data from the individual premises 202, process it according to its data rules to generate an action assessment. Additionally, the central processing server 304 may also obtain additional information, such as from the external data sources 312, as part of the data processing step, or as a result of a preliminary data processing. For example, the central server 304 can obtain an action assessment and monitoring device data from an individual premises server 204, and then could request additional information from an external data source 314, such as an FBI record database. In conjunction with its processing rules and the additional data, the central processing server 304 may generate one or more action assessments and implement any number of actions. Accordingly, the biometric data processing system 300 can implement multiple layers for processing.

In an illustrative embodiment of the present invention, the central server 304 may also serve as a repository and distributor of data to various premises 202. In accordance with this embodiment, and as will be explained in greater detail below, the central server 304 is operable to transmit data templates, data rules and/or data profiles to one or more premises servers 204. Additionally, the central server 304 may be operable to process the data transmitted to the individual premises server 204 according to a particular format/encoding specified for the premises server. For example, a single data template may be processed differently, in terms of format and encoding, depending on the requirements and security rights of the receiving premises server 204. The data transmission may be periodic or upon request by the premises server 204. Moreover, the premises server 204 may store the transmitted data locally after it has been received or it may be discarded after use.

Although only a single central processing server 304 is illustrated in FIG. 3, one skilled in the relevant art will appreciate that any number of central processing servers 304 may be implemented to process data from premises servers 204. Moreover, multiple central processing servers 304 may be utilized within a biometric data processing system 300 to generate any number of processing layers. For example, a second central processing server 304 may be utilized to process data from the first central processing server 304, or group of central processing servers 304 (not shown).

Figure 4:
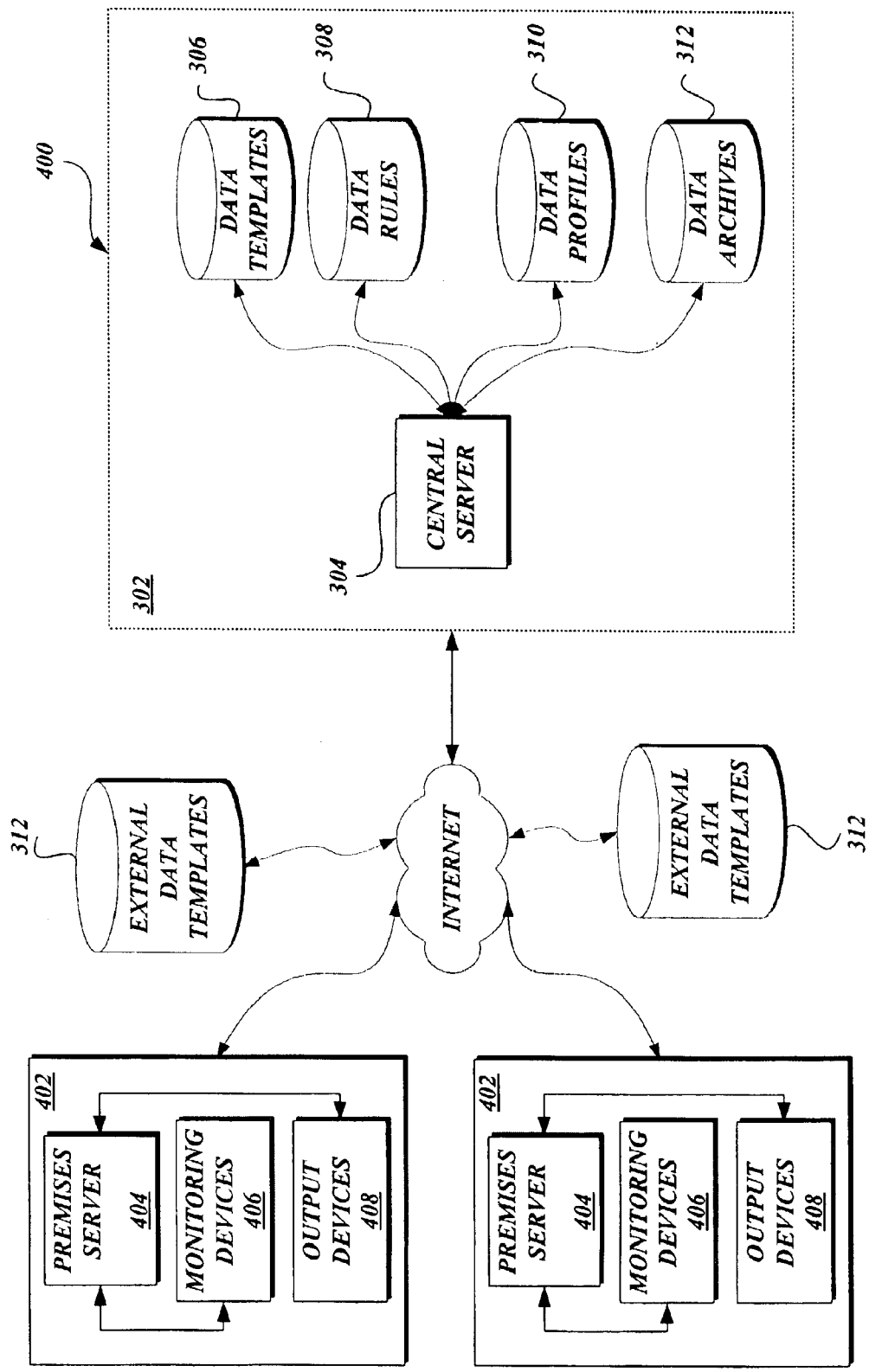
FIG. 4 is a block diagram illustrative of a biometric data processing system including a central server and two external data sources formed in accordance with an alternative embodiment of the present invention.

With reference now to FIG. 4, an alternative embodiment for a biometric data processing system 400 will be described. In accordance with this embodiment, the biometric data processing system 400 includes a number of premises 402 that include a premises server 404, monitoring devices 406, and output devices 408. However, the premises server 404 does not include additional data sources, such as a data templates database, a data rules database, a data profiles database, or a data archives database, to process the monitoring device data. In one embodiment, all of the monitoring device and output device data is transferred to a central server 304 which evaluates monitoring device data according to the data template database 306, the data rules database 308, and the data profiles database 310, described above. The central server 304 can obtain additional external data from an external data templates 312. However, one skilled in the art will appreciate that the central server 304 can then transfer the data to an additional layer (not shown) to still implement multiple layers of data processing.

In accordance with this embodiment of the present invention, the individual premises 402 no longer have the ability to process the monitoring device data and transfer it to an external source. Additionally, in another embodiment of the present invention, the premises server 402 may also be omitted such that the monitoring devices 406 transmit data directly to the central server 304. Still further, the biometric data processing system 400 may be further modified to include a combination of premises 202 (FIG. 2) having a premises server 204 processing at least a portion of the monitoring device data and premises 402 communicating at least a portion of unprocessed monitoring device data to a central processing server 304. All such embodiments are considered to be within the scope of the present invention.

In still a further embodiment of the present invention, a biometric data processing system may be implemented in a peer-to-peer network. In accordance with this embodiment, at least some of the premises 402 provide the function of the central server 304. In one embodiment, a central server 304 may co-exist with the premises. Alternatively, the central server 304 may be omitted altogether and the function may be implemented by one or more premises 402. All embodiments are considered to be within the scope of the present invention.

Figure 5:
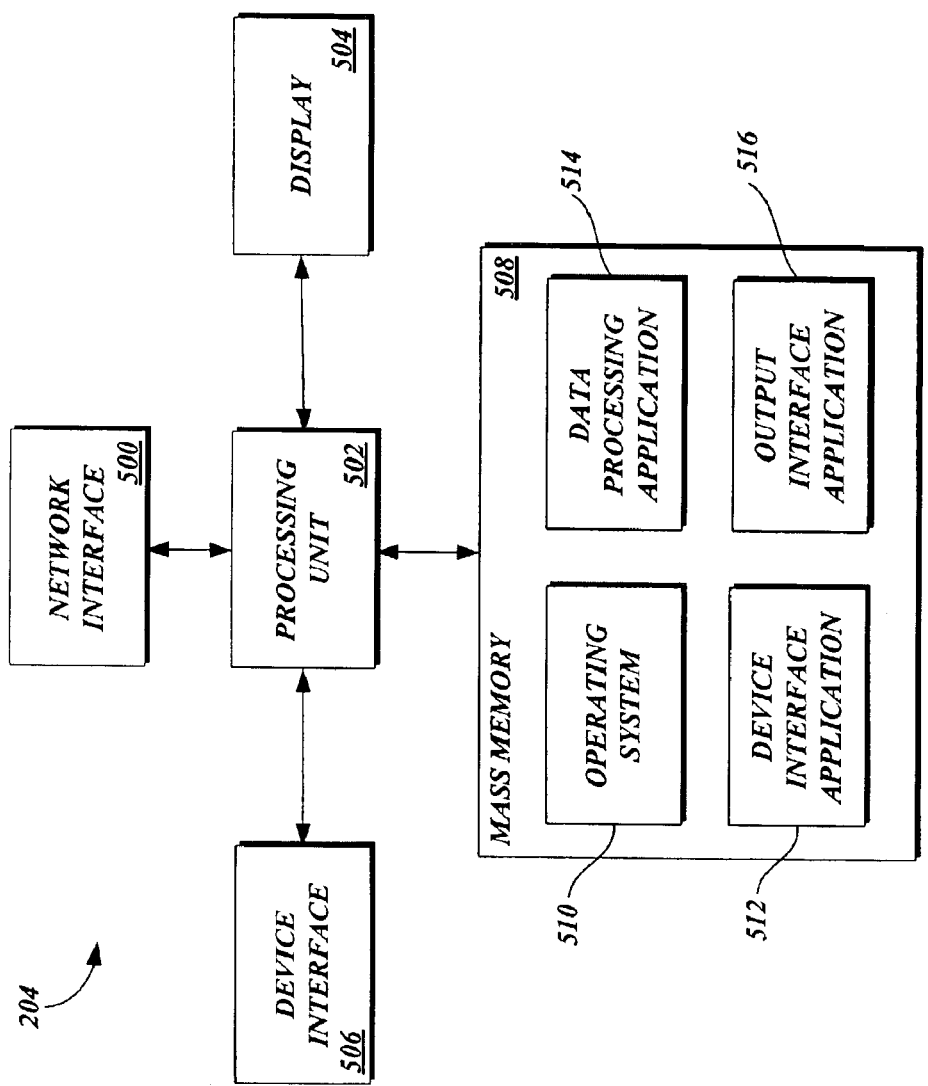
FIG. 5 is a block diagram of an illustrative architecture for a premises server formed in accordance with the present invention.

FIG. 5 is a block diagram depicting an illustrative architecture for a premises server 204 (FIG. 2). Those of ordinary skill in the art will appreciate that the premises server 204 includes many more components then those shown in FIG. 5. However, it is not necessary that all of these generally conventional components be shown in order to disclose an illustrative embodiment for practicing the present invention. As shown in FIG. 5, the premises server 204 includes a network interface 500 for connecting directly to a LAN or a WAN, or for connecting remotely to a LAN or WAN. Those of ordinary skill in the art will appreciate that the network includes the necessary circuitry for such a connection, and is also constructed for use with the TCP/IP protocol, the particular network configuration of the LAN or WAN it is connecting to, and a particular type of coupling medium. The premises server 204 may also be equipped with a modem for connecting to the Internet through a point-to-point protocol ("PPP") connection or a serial-line Internet protocol ("SLIP") connection as known to those skilled in the art.

The premises server 204 also includes a processing unit 502, an optional display 504, a device interface 506 and a mass memory 508, all connected via a communication bus, or other communication device. The device includes hardware and software components that facilitate interaction with a variety of the monitoring devices via a variety of communication protocols including TCP/IP, X10, digital I/O, RS-232, RS-485 and the like. Additionally, the device interface 506 facilitates communication via a variety of communication mediums including telephone land lines, wireless networks (including cellular, digital and radio networks), cable networks and the like. In an actual embodiment of the present invention, the device interface 506 is implemented as a layer between the server hardware and software applications utilized to control the individual monitoring devices. It will be understood by one skilled in the relevant art that alternative interface configurations may be practiced with the present invention.

The mass memory 508 generally comprises a RAM, ROM, and a permanent mass storage device, such as a hard disk drive, tape drive, optical drive, floppy disk drive, or combination thereof. The mass memory 508 stores an operating system 510 for controlling the operation of the premises server. It will appreciated that this component may comprise a general-purpose server operating system as is known to those skilled in the art, such as UNIX, LINUX™, or Microsoft WINDOWS NT®, 2000, XP, and the like. The memory also includes a WWW browser, such as Netscape's NAVIGATOR® or Microsoft's Internet Explorer browsers, for accessing the WWW.

The mass memory 508 also stores program code and data for interfacing with various premises monitoring devices, for processing the monitoring device data and for transmitting the processed data. More specifically, the mass memory 508 stores a device interface application 512 in accordance with the present invention for obtaining monitoring device data from a variety of devices and for manipulating the data for processing. The device interface application 512 comprises computer-executable instructions which, when executed by the premises server 204 obtains and transmits device data as will be explained below in greater detail. The mass memory 508 also stores a data processing application 514 for obtaining data profiles from the data profiles database 210, obtaining data templates from the data templates database 206, and for processing monitoring device data in accordance with rules maintained within the rules database 208. The mass memory 508 further stores an output interface application program 516 for transmitting processed device data to one or more external system components. The operation of the output interface application 516 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive.

Figure 6:
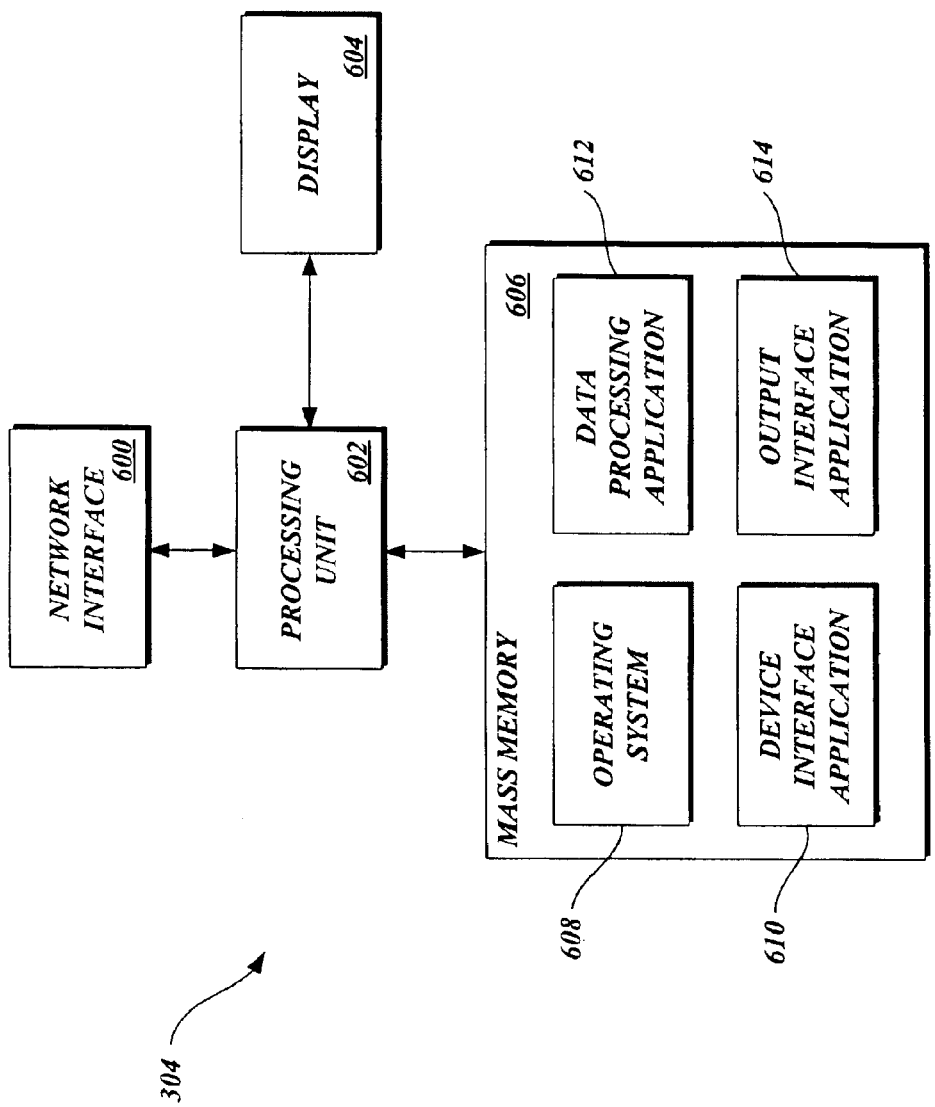
FIG. 6 is a block diagram of an illustrative architecture of a central processing server formed in accordance with the present invention.

FIG. 6 is a block diagram depicting an illustrative architecture for a central server 304 (FIG. 3). Those of ordinary skill in the art will appreciate that the central server 304 includes many more components then those shown in FIG. 6. However, it is not necessary that all of these generally conventional components be shown in order to disclose an illustrative embodiment for practicing the present invention.

As shown in FIG. 6, the central server 304 includes a network interface 600 for connecting directly to a LAN or a WAN, or for connecting remotely to a LAN or WAN. Those of ordinary skill in the art will appreciate that the network interface includes the necessary circuitry for such a connection, and is also constructed for use with the TCP/IP protocol, the particular network configuration of the LAN or WAN it is connecting to, and a particular type of coupling medium. The central server 304 may also be equipped with a modem for connecting to the Internet 20.

The central server 304 also includes a processing unit 602, an optional display 604 and a mass memory 606, all connected via a communication bus, or other communication device. The mass memory 606 generally comprises a RAM, ROM, and a permanent mass storage device, such as a hard disk drive, tape drive, optical drive, floppy disk drive, or combination thereof. The mass memory 606 stores an operating system 608 for controlling the operation of the central server. It will be appreciated that this component may comprise a general-purpose server operating system.

The mass memory 606 also stores program code and data for interfacing with the premises devices, for processing the device data and for interfacing with various authorized users. More specifically, the mass memory 606 stores a premises interface application 610 in accordance with the present invention for obtaining data from a variety of monitoring devices and for communicating with the premises server. The premises interface application 610 comprises computer-executable instructions that, when executed by the central server 304, interfaces with the premises server 204 as will be explained below in greater detail. The mass memory 606 also stores a data processing application 612 for obtaining data profiles and data templates from a variety of resources and for processing monitoring device data in accordance with rules maintained within the rules database 308. The operation of the data processing application 612 will be described in greater detail below. The mass memory 606 further stores an output interface application 614 for outputting the processed monitoring device data to a variety of authorized users or additional central processing servers 304 in accordance with the present invention. The operation of the output interface application 614 will be described in greater detail below. It will be appreciated that these components may be stored on a computer-readable medium and loaded into the memory of the central server using a drive mechanism associated with the computer-readable medium.

Generally described, the present invention facilitates the collection and processing of biometric premises information. In an illustrative embodiment of the present invention, the system can be further utilized to process the biometric premises information to generate one or more action assessments of potential future activity. Additionally, the system may be configured to accept additional data inputs from the monitoring devices data, not specifically associated with biometric identification information. The system of the present invention obtains monitoring device data from any one of a variety of monitoring devices 214.

In an actual embodiment of the present invention, monitoring device data can be characterized as asset data, resource data, or event data. Asset data is obtained from monitoring device 214 corresponding to an identifiable object that is not capable of independent action. For example, asset data includes data obtained from a bar code or transponder identifying a particular object, such as a computer, in a particular location. Resource data is obtained from monitoring device 214 corresponding to an identifiable object that is capable of independent action. For example, resource data includes fingerprint data obtained from a fingerprint identification reader that can be utilized to identify a particular person who has placed their hand in the reader. Event data is obtained from a monitoring device 214 corresponding to an on/off state that is not correlated to an identifiable object. Event data is a default category for all of the monitoring devices. As will be readily understood by one skilled in the relevant art, alternative data characterizations are considered to be within the scope of the present invention.

In an illustrative embodiment of the present invention, the monitoring device data is obtained by the monitoring devices on the premises server 204 and processed according to some form of decision logic. In an actual embodiment of the present invention, the premises server 204 maintains a data rules database 208 (FIG. 2) having logical rules for asset data, resource, and event data. Because the monitoring device data is potentially applicable to one or more authorized users, multiple data rules may be applied to the same monitoring device data. Alternatively, the monitoring device data may be processed according to weighted decision logic, such as a learning system, that does not utilize fixed decision logic. Still further, as illustrated in FIGS. 3 and 4, some or all of the monitoring device's monitoring device data may be processed by the central server 304 according to different processing layer logic rules maintained in the data rules database 308.

Based upon the evaluation of the decision logic, the premises server 204 can generate an action assessment corresponding to the outcome of a calculated threat assessment (a determined likelihood of a target event occurring). In an illustrative embodiment of the present invention, the action assessment may be in the form of a numerical indicator that has one or more actions associated with it. For example, in a transportation-monitoring embodiment, a numerical action assessment can cause public safety or law enforcement authorities to implement a predefined set of actions. In another embodiment of the present invention, the action assessment can be in the form of a set of customized actions initiated by output devices corresponding to, or otherwise controlled by, the monitoring system. With reference to the transportation security example, a customized action assessment can be in the form of a transfer of data to an individual, or group of individuals, that are determined to be relevant to the particular set of monitoring device data. For example, the use of biometric identification to identify an individual on a watch list may cause an alarm to sound or for pertinent information (e.g., location, time, etc.) to be transferred to local, regional, national, or global law enforcement authorities. Moreover, in yet another embodiment of the present invention, the biometric processing system 200, 300, or 400, may generate a combination of predetermined numerical identifiers and customized actions.

In an illustrative embodiment of the present invention, the biometric data processing system as illustrated in FIGS. 3 and 4 may be utilized as a distributed processing environment for a variety of premises servers 204 (FIG. 2). In accordance with this embodiment of the present invention, the central server 304, or central servers, form and distribute data profiles, data templates, and/or data rules as required and authorized by the premises server. Accordingly, the central server 304 can receive and store data templates from a number of sources, including third party vendors. Additionally, some or all the data templates may be generated or modified by the central facility 302.

In an illustrative embodiment of the present invention, the templates are stored in a format selected by the template generator. However, because visual and audio data can be processed in a number of formats/encoding, the central server 304 can then format and encode the data templates as specified by the premises server 204. For example, the central server 304 may alternately format video data stored as a bitmap into a Joint Pictures Expert Group ("JPEG") format as designated by the premises server 204 or as an Audio Video Interleave ("AVI") file. Other formatting tasks can include adjusting the resolution of the data, filtering data, interpolation, and the like. Additionally, the central server 304 may encode the data template with security encoding such that the data transmitted to the individual premises 202 may be limited according to the security authorization of the particular premises 202. In one embodiment, the data transmitted to individual premises 202 includes data identifying its origination. Still further, formatting tasks may include a digital encoding of the file to verify and or authenticate contents, such as the inclusion of a watermark, or a copyright notification.

In another aspect of this embodiment, the data transmitted to the individual premises may be done on a periodic basis as initiated by the central server 304. Alternatively, the data may be distributed as requested by individual premises servers 204 to the central server 304. Moreover, the data transmissions may be accomplished through background processes that mitigate strains on the resources of the premises server 204.

Figure 7:
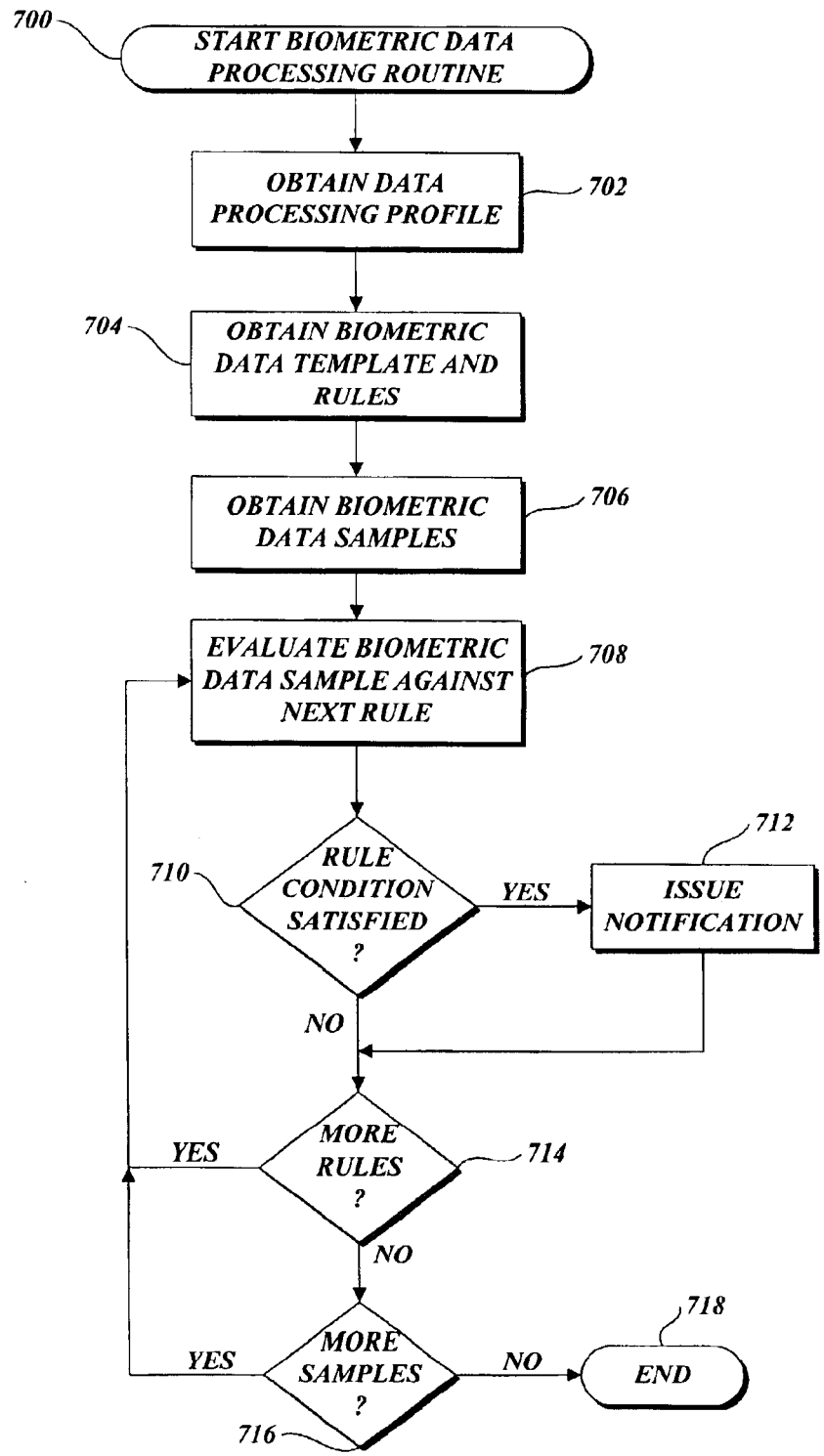
FIG. 7 is a flow diagram illustrative of a biometric data processing routine implemented by a premises or central processing server in accordance with the present invention.

With reference now to FIG. 7, a routine 700 for processing biometric monitoring device data implemented by a premises server 204 in accordance with the present invention will be described. Although routine 700 will be described with relation to a premises server 204, the routine 700 may be implemented by the central server 304, or other similarly configured computing devices. With reference to FIG. 7, at block 702, the data processing application 514 obtains one or more data processing profiles. In an illustrative embodiment of the present invention, the data profiles may be obtained from the data profiles database 210 in communication with the premises server 204. Alternatively, the data profile may be obtained from the data profile database 310 of the central server 304 (FIG. 3). The selection of the data profile may occur in a variety of manners. In one embodiment, a system administrator may utilize an interface, such as a graphical user interface, to select one or more data profiles to be utilized. In another embodiment, the data processing application 514 may be configured to automatically select data profiles based upon the type of monitoring device data being received. For example, the data processing application 514 may utilize an association table to determine which data profile to select.

In accordance with the present invention, the data profile includes data that specifies one or more data templates, one or more data rules, and various action assessments, corresponding to a particular data input from a monitoring device. For example, video facial recognition biometric monitoring device data would have a corresponding data profile that would specify the source of the data templates to be searched, the particular rules to apply to the monitoring device data and the data templates, and a specification of one or more outputs associated with the outcome of an evaluation of the corresponding data rules. In an illustrative embodiment of the present invention, the data processing profile may be maintained locally or obtained from an external source. Additionally, the data profiles may be generated by a central monitoring source, such as a central processing facility 302. Alternatively, the data profiles may be either generated and/or modified by each individual premises 202.

At block 704, the data processing application 514 obtains biometric data templates and rules as specified in the data processing profile. In an illustrative embodiment of the present invention, the data rules and data templates may be obtained from the data templates database 206 and the data rules database 208, which are local to the premises server 204. Alternatively, one or more data templates and/or one or more data rules may be obtained from external sources such as the data templates database 306 or the data rules database 308. Still further, the external data templates and/or rules may be obtained from an external source, such as the external data templates rules 314. Similar to the data templates, the biometric data templates and rules may be generated by central facility 302 and transferred directly to the premises 202. Alternatively, the premises 202 may generate its data templates and data rules and/or modify general templates generated by the central facility 302. In an illustrative embodiment, the system updates the data template with the most recently collected monitoring device data, in the event that a match is found. In that embodiment, the previous data template becomes an auxiliary (active or inactive) or secondary template source. Accordingly, the premises server 204 may synchronize its modified or generated data templates with the central server 304 for distribution to other monitoring device data processing computing devices.

In accordance with the present invention, the data templates can be stored as unique data files that are indexed by a database table. The data templates can include sample data utilized to evaluate a data rule against monitoring device data. For example, a data template can include a frame of video data associated with the facial features of a particular individual. Accordingly, the facial feature data template would be utilized to determine whether the individual is likely identified in the monitoring device data. In another example, a data template can include audio data associated with a number of audibly recognized sounds (e.g., an explosion, a particular car horn, and an individual's voice pattern). Similarly, the audio template data could be utilized to evaluate whether a particular sound (and likely the item generating the sound) is present in the monitoring device data.

At block 706, the device interface application 512 obtains biometric data samples from one or more biometric monitoring devices. In one embodiment of the present invention, the monitoring device data may be obtained from monitoring devices 514. For example, the device interface application may obtain facial recognition video data, fingerprint identification data, DNA samples, and variety of other information data. In another embodiment of the present invention, some or all of the biometric data samples may be obtained from the data archives database 212. For example, the premises server 204 may archive monitoring device data until a condition is satisfied (e.g., expiration of a given time period, occurrence of a triggering event, evaluation of a data rule) prior to submitting the monitoring device data sample for processing. In an illustrative embodiment of the present invention, the biometric data may be raw data that will require further processing by the device interface application 514 prior to the evaluation of the rule (e.g., conversion of format, decompression of a data file, filtering, etc.). Alternatively, the monitoring device 214 and/or any additional device servers (not shown) may be utilized to translate the monitoring device data and/or process the data prior to being received by the device interface application 512.

At block 708, the data processing application 514 evaluates the biometric data sample against the next data rule. In an illustrative embodiment of the present invention, a data sample may be evaluated against multiple data rules as specified in the processing data profile. Accordingly, an iterative process can be initiated in which one or more data samples are processed against one or more data rules. At decision block 710, a test is conducted to determine whether a data rule has been satisfied by the data sample. In accordance with the present invention, a variety of embodiments may be utilized to evaluate data rules against data samples. Additionally, the evaluation of data rules can include a predictive analysis related to a likelihood of a future event occurring is generated. Additionally, the evaluation of data rules can include a reactive analysis related to the generation of a likelihood of whether an event has already occurred.

In one embodiment of the present invention, the data processing application may utilize programmatic rules-based logic to process the biometric monitoring device data. In accordance with this embodiment, the data processing application 514 utilizes predefined programmatic rules supplied by the data rules database 208 to process the data samples. The data processing application 514 may utilize third-party tools, such as facial recognition software, and/or incorporate additional pieces of information to evaluate the rules. The data processing application 514 may utilize both a predictive analysis to generate an action assessment, a reactive analysis to generate a reactive action, or a combination of both predictive and reactive analysis.

In an alternative embodiment of the present invention, the rules-based logic may also utilize declarative rules-based logic to process the biometric monitoring device data. In accordance with this embodiment, a system administrator, or other authorized personnel, can modify, or customize, an action assessment for particular evaluation of inputs and/or to modify the number or combination of inputs supported by the data processing application 514 through a declarative interface. In accordance with this embodiment of the present invention, the data rules database 208 is populated with a pre-defined set of data rules. Accordingly, the rules are modified according to preferences set by each premises administrator by using a declarative user interface, such as a graphical user interface. Accordingly, a system administrator may vary the threshold levels utilized to determine evaluation of the rules.

In yet another embodiment of the present invention, the data processing application 514 may utilize a learning machine/system, such as a neural network or SVM, to establish an action assessment or reactive assessment based upon values for a given number of inputs. One skilled in the relevant art will appreciate that a learning machine utilizes weighting scales for processing a given number of inputs to generate an output. By utilizing a number of training data sets in which an output is known for a given set of inputs, the learning machine can be trained to adjust the weight values for the various inputs and generate an appropriate output, or set of outputs. In accordance with this embodiment, the data processing application would utilize a learning machine to generate an action assessment output based on values for any number of data inputs and combination of inputs. Moreover, the data rules database 208 could include different weighting schemes that allow for modification of the learning machine outputs for different use cases. For example, the learning machine may include specific weighting schemas for specific biometric monitoring devices, such as particular microphone, particular areas of monitoring (e.g., crowded area vs. unoccupied area), or a time of day. Likewise in one embodiment, each premises 202,through an administrator, would have a capability to modify the weights for each input to customize a processing of data.

In accordance with the present invention, one or more additional software components, methods, or algorithms may be utilized corresponding to the type of biometric input data being processed. For example, a biometric fingerprint data analysis may require a specific set of software analytical tools and/or processes for a comparison of template fingerprint data to fingerprint data that has been collected or generated by a monitoring device. Likewise, facial recognition data may require a special set of tools and processes that facilitate the processing of the facial recognition biometric identification data. In another example, audio template data may utilize one or more interpolation thresholds for determining a likelihood that audio sample data may match an audio template. Accordingly, the biometric data processing system 200, 300, or 400 may be modified according to the type of input or inputs received by the system.

If the rule is not satisfied, the routine 700 proceeds to decision block 714, as will be described below. If, on the other hand, the rule condition is satisfied, the routine 700 proceeds to block 712, where the output interface application 516 issues a notification. In accordance with this embodiment of the present invention, the data profile for the particular type of data includes output information depending on the outcome of the rule evaluation. For example, the output interface application 516 may issue a notification in the form of a communication to a number of authorized users whose communication preferences are recorded in the device profile. Additionally, the output interface application 516 may issue a transmission of the biometric monitoring device data to an additional layer, such as the central server 304 that would include a request for additional processing. Still further, the output interface application 516 may initiate further processing of data according to a different set of rules in consideration of additional inputs based on given rule evaluation. The output interface application 516 may record all rule processing transactions to a log file or a database to keep a record of all processes being rendered.

At decision block 714, a test is conducted to determine whether there are any more data rules to be evaluated. If there are more rules, the routine 700 returns to block 708 for evaluation of the biometric data sample against the next data rule. If there are no more rules to be evaluated, at decision block 716, a test is conducted to determine whether there are anymore biometric data samples to be evaluated. In accordance with this embodiment of the present invention, a given monitoring scenario may generate several data samples within a relatively short period of time. Accordingly, each individual piece of data may be processed by the data processing application 514. Additionally, after each individual set of biometric data is evaluated, the data processing application 514 may process the biometric monitoring device data in one or more groupings, including the monitoring device data as a whole. Accordingly, if there are more data samples, the routine 700 returns to block 708. If there are no more samples, at block 718, the routine 700 terminates.

The system and routines of the present invention may be incorporated in a number of monitoring environments. In one aspect, the present invention may be configured as a security assessment system to monitor public safety in a transportation system. In accordance with this embodiment, biometric monitoring device data may be obtained through reservation systems, travel agencies, check-in systems, airport gates, and the like, to assess passenger safety security examples. For example, the biometric data processing system would be capable of processing biometric facial recognition input, fingerprint identification information, along with reservation systems destination information, the number of bags checked, and the FBI criminal database to generate passenger security assessments. Additionally, the biometric data processing system of the present invention would also be operable to obtain monitoring device data, such as video data, from an controlled area for the purpose of making a system generated decision to grant or deny an individual access to a restricted area.

In another embodiment of the present invention, the biometric data processing system of the present invention may be utilized as a behavioral pattern monitoring system. In accordance with this embodiment, biometric monitoring device data, such as fingerprint data, video facial recognition data, audio voice data, is processed to determine the number of times an individual or associated group of individuals have been present in a monitored area over a given period of time. Accordingly, the data processing application 514 may process archived and live monitoring device data to generate an action assessment as to the likelihood of the individual reappearing in an area (e.g., predictive behavior) or to assess whether there is a likelihood of a potential illegal action occurring (e.g., casing a bank).

In a further embodiment of the present invention, the biometric data processing system of the present invention may be configured in a commercial sales environment to monitor various aspects of consumer sales. In one embodiment, an action assessment system may be configured to utilize biometric identification information, such as facial recognition data and fingerprint data, to prevent future shoplifting offenses or fraud at a point-of-sale terminal. In this embodiment, the biometric monitoring device data may be obtained from the point-of-sale terminal, or from video cameras, to identify individuals that may be associated with previous criminal or fraudulent activity.

In still another embodiment of the present invention, the biometric data processing system of the present invention may be utilized to monitor computer network usage. In accordance with this embodiment, some computer login passwords may be associated with specific biometric data templates. As applied to a computer network having many terminals located in remote geographic locations, the biometric data processing system would obtain biometric monitoring device data, such as facial recognition data or an audio data sample, from a user attempting to login from a computing device. The premises server 204 corresponding to the terminal could then request the specific data profile corresponding to the user from a central server 204 to verify the identity of the user.

In yet another embodiment of the present invention, the biometric data processing system may be configured to reward consumer spending. In this embodiment, facial recognition data may be utilized to identify consumers who have a positive frequent use and to reward those customers for entering certain stores. Additionally, the facial recognition data may be utilized to monitor which store locations are frequented by a particular consumer.

In another embodiment of the present invention, the biometric data processing system of the present invention may be utilized to monitor certain audio inputs and generate action assessments based on those inputs. In accordance with one aspect of this embodiment, biometric audio data samples may be utilized to monitor for specific circumstances that have a tendency to occur in a monitored area. For example, in one embodiment of the present invention, data profiles may be supplied that correspond to sounds that should not occur within a monitored area. For example, an emergency data profile may test audio data against data templates of various gun shots, explosions, fires, and the like, such that biometric audio inputs are received and matched to determine whether there is a likelihood that any of these particular events are occurring within a monitoring data. In another embodiment of the present invention, data profiles may be provided that correspond to sounds that should occur within a monitored area. For example, a normal working data profile may test audio data against data templates of machinery noises (e.g., engines, compressors, and printing press) to ensure that the machinery is running and/or running properly.

In still a further embodiment of the present invention, the biometric data processing system of the present invention may be utilized to process audio biometric data inputs to identify stress situations. For example, audio profiles may be provided to establish a decibel threshold for noises within a given area. Accordingly, audio data indicating a scream or loud voices would generate a particular action assessment within the biometric data processing system. Similarly, audio data profiles may also be provided that refer to data templates corresponding to particular individuals talking in a stress-free manner. Accordingly, the biometric data processing system may process audio data from a particular individual to determine whether the audio data indicates an increased stress level on the individual.

In accordance with the above referenced embodiments, each individual premises server may obtain data profiles from a central facility 302, and may modify the data profile to reflect specific notification requirements of the premises 202. For example, an airport premises server 204 may modify some or all data profiles to cause airport authorities to be notified of an emergency situation prior to local authorities. Likewise, a commercial establishment premises server 204 may modify some or all data profiles to cause the premises server 204 to notify the store manager via an individualized contact method.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a system including a plurality of monitoring devices generating different data types, a method for processing monitoring device data received from at least one of the plurality of monitoring devices, the method comprising:
   obtaining monitoring device data characteristic of an individual from at least one of the plurality of monitoring devices;
   associating at least one data profile corresponding to a data type of the obtained monitoring device data, wherein the data profile includes an identification of a data processing template, at least one processing rule and at least one action assessment corresponding to the processing of the data processing template and at least one processing rule;
   processing the monitoring device data according to the at least one data profile; and
   generating an action assessment corresponding to the processing of the monitoring device data to the at least one data profile.

2. The method as recited in claim 1 further comprising retrieving the at least one data profile from a local data profile repository.

3. The method as recited in claim 1 further comprising obtaining the at least one data profile from a remote data profile repository.

4. The method as recited in claim 1, wherein the data profile corresponds to a number of processing computing devices.

5. The method as recited in claim 1, wherein the data profile corresponds to a customized data profile.

6. The method as recited in claim 1, wherein associating at least one data profile includes obtaining at least one corresponding data profile from a data profile association table.

7. The method as recited in claim 1, wherein associating at least one data profile includes associating a data profile with a type of monitoring device.

8. The method as recited in claim 1, wherein associating at least one data profile includes associating a data profile with an area being monitored.

9. The method as recited in claim 1 further comprising processing the monitoring device data prior to processing the monitoring device data according to the at least one data profile.

10. The method as recited in claim 1 further comprising updating the data template with the monitoring device data.

11. The method as recited in claim 10, wherein updating the data template includes replacing at least a portion of the data template with the monitoring device data.

12. The method as recited in claim 1, wherein generating an action assessment corresponding to the processing of the monitoring device data to the at least one data profile includes generating predictive data in the form of a threat assessment.

13. The method as recited in claim 1, generating an action assessment corresponding to the processing of the monitoring device data to the at least one data profile includes generating an audible alarm.

14. The method as recited in claim 1, wherein generating an action assessment corresponding to the processing of the monitoring device data to the at least one data profile includes transmitting a notification corresponding to a result of the processing of the monitoring device data.

15. The method as recited in claim 1, wherein generating an action assessment corresponding to the processing of the monitoring device data to the at least one data profile includes invoking a second analysis of the monitoring device data.

16. The method as recited in claim 15, wherein invoking a second analysis includes invoking a second analysis from a remote processing computing device.

17. The method as recited in claim 15, wherein invoking a second analysis includes obtaining additional data and generating a second action assessment corresponding to the processing of the monitoring device data and the additional data to the at least one data profile.

18. The method as recited in claim 1, wherein the action assessment corresponds to a predictive threat level.

19. The method as recited in claim 1, wherein the action assessment corresponds to a behavioral analysis.

20. The method as recited in claim 1, wherein the action assessment corresponds to an action selection from a group consisting of a public transportation threat assessment, a behavioral pattern matching, a commercial sales fraud assessment, a point-of-sale terminal fraud threat assessment, a computing device network threat assessment, a consumer spending assessment, and an audio threat assessment.

21. The method as recited in claim 1, wherein generating an action assessment corresponding to the processing of the monitoring device data to the at least one data profile occurs remote from the monitoring device.

22. A computer-readable medium having computer-executable instructions for performing the method recited in claim 1.

23. A computer system having a processor, a memory and an operating system, the system operable to perform the method as recited in claim 1.

24. A system for processing monitoring device data received from at least one of a plurality of monitoring devices, the system comprising:
at least one monitoring device generating monitoring device data characteristic of an individual, wherein a type of the monitoring device data generated by the at least one monitoring device is different than a type of monitoring device data generated by at least one other of the plurality of monitoring devices;
a data profile repository maintaining data profiles for processing monitoring device data based on the type of monitoring device data, wherein the data profile includes an identification of a data processing template, at least one processing rule and at least one action assessment corresponding to the processing of the data processing template and at least one processing rule; and
a data processing computing device for processing the monitoring device data according to at least one data profile and for generating an action assessment defined in the data profile.

25. The system as recited in claim 24, wherein the data profile repository is local to at least one monitoring device.

26. The system as recited in claim 24, wherein the data profile repository is remote from at least one monitoring device.

27. The system as recited in claim 24, wherein the data profile corresponds to a number of processing computing devices.

28. The system as recited in claim 24, wherein the data profile corresponds to a customized data profile.

29. The system as recited in claim 24, wherein the data processing computing device utilizes an association table to associate a data profile to the type of monitoring device data.

30. The system as recited in claim 24, wherein the data processing computing device associates a data profile with a type of monitoring device.

31. The system as recited in claim 24, wherein the data processing computing device associates a data profile with an area being monitored.

32. The system as recited in claim 24, wherein the data processing computing device updates a data template with the monitoring device data.

33. The system as recited in claim 24, wherein the action assessment corresponds to predictive data in the form of a threat assessment.

34. The system as recited in claim 24, wherein the action assessment corresponds to generating an audible alarm.

35. The system as recited in claim 24, wherein the action assessment corresponds to transmitting a result of the processing of the monitoring device data.

36. The system as recited in claim 24, wherein the action assessment corresponds to invoking a second analysis.

37. The system as recited in claim 36 further comprising a second data processing computing device for processing the monitoring device data according to at least one data profile and for generating an action assessment defined in the data profile.

38. The system as recited in claim 37, wherein the second data processing data is remote from the first computing device.

39. The system as recited in claim 36, wherein the data processing computing device obtains additional data and processes the monitoring device data and the additional data to generate an action assessment.

40. The system as recited in claim 24, wherein the action assessment corresponds to a predictive threat level.

41. The system as recited in claim 24, wherein the action assessment corresponds to a behavioral analysis.

42. The system as recited in claim 24, wherein the action assessment corresponds to an action selection from a group consisting of a public transportation threat assessment, a behavioral pattern matching, a commercial sales fraud assessment, a point-of-sale terminal fraud threat assessment, a computing device network threat assessment, a consumer spending assessment, and an audio threat assessment.

43. The system as recited in claim 24 further comprising a second data profile repository maintaining data profiles for processing at least a portion of the monitoring device data, wherein second data profile is remote.

44. In a system including a first monitoring devices generating a first data type and a second monitoring device generates a second data type, wherein the first data type and the second data type are different, and a processing computing device for generating an action assessment, a method for processing monitoring device data, the method comprising:
obtaining monitoring device data characteristic of an individual from the first monitoring device;
selecting at least one data profile for processing the monitoring device data based on the first data type, wherein the data profile includes an identification of a data processing template, at least one processing rule and at least one action assessment corresponding to the processing of the data processing template and at least one processing rule;
processing the monitoring device data according to the at least one data profile; and
determining an action assessment corresponding to the processing of the monitoring device data to the at least one data profile.

45. The method as recited in claim 44 wherein selecting a data profile includes retrieving the at least one data profile from a local data profile repository.

46. The method as recited in claim 44, wherein selecting a data profile includes obtaining the at least one data profile from a remote data profile repository.

47. The method as recited in claim 44, wherein the data profile a number of processing computing devices.

48. The method as recited in claim 44, wherein the data profile corresponds to a customized data profile.

49. The method as recited in claim 44, wherein selecting at least one data profile includes obtaining at least one corresponding data profile from a data profile association table.

50. The method as recited in claim 44 wherein selecting at least one data profile includes associating a data profile with a type of monitoring device.

51. The method as recited in claim 44, wherein selecting at least one data profile includes associating a data profile with an area being monitored.

52. The method as recited in claim 44 further comprising updating the data template with the monitoring device data.

53. The method as recited in claim 44, wherein determining an action assessment corresponding to the processing of the monitoring device data to the at least one data profile includes generating predictive data in the form of a threat assessment.

54. The method as recited in claim 44, wherein determining an action assessment corresponding to the processing of the monitoring device data to the at least one data profile includes generating an audible alarm.

55. The method as recited in claim 44, wherein determining an action assessment corresponding to the processing of the monitoring device data to the at least one data profile includes transmitting a notification corresponding to a result of the processing of the monitoring device data.

56. The method as recited in claim 44, wherein determining an action assessment corresponding to the processing of the monitoring device data to the at least one data profile includes invoking a second analysis of the monitoring device data.

57. The method as recited in claim 56, wherein invoking a second analysis includes invoking a second analysis from a remote processing computing device.

58. The method as recited in claim 56, wherein invoking a second analysis includes obtaining additional data and generating a second action assessment corresponding to the processing of the monitoring device data and the additional data to the at least one data profile.

59. The method as recited in claim 44, wherein the action assessment corresponds to a predictive threat level.

60. The method as recited in claim 44, wherein the action assessment corresponds to a behavioral analysis.

61. The method as recited in claim 44, wherein the action assessment corresponds to an action selection from a group consisting of a public transportation threat assessment, a behavioral pattern matching, a commercial sales fraud assessment, a point-of-sale terminal fraud threat assessment, a computing device network threat assessment, a consumer spending assessment, and an audio threat assessment.

62. The method as recited in claim 44, wherein generating an action assessment corresponding to the processing of the monitoring device data to the at least one data profile occurs remote from the monitoring device.

63. A computer-readable medium having computer-executable instructions for performing the method recited in claim 44.

64. A computer system having a processor, a memory and an operating system, the system operable to perform the method as recited in claim 44.

65. In a system including a plurality of biometric monitoring devices generating different biometric data types, a method for processing biometric data received from at least one of the plurality of monitoring devices, the method comprising:

obtaining biometric data characteristic of an individual of a particular data type from at least one of the plurality of monitoring devices;

associating at least one data profile corresponding to a biometric data type of the obtained biometric data, wherein the data profile includes an identification of a data processing template, at least one processing rule and at least one action assessment corresponding to the processing of the data processing template and at least one processing rule;

processing the monitoring device data according to the at least one data profile; and generating an action assessment corresponding to the processing of the monitoring device data to the at least one data profile.

66. The method as recited in claim 65 wherein the plurality of biometric monitoring devices are selected from a group of biometric monitoring devices including a voice identification device, an image capture device, a microphone, a fingerprint identification device, a retinal identification device, and a DNA identification device.

67. The method as recited in claim 65 further comprising at least one non-biometric monitoring device.

* * * * *

UNITED STATES PATENT AND TRADEMARK OFFICE
CERTIFICATE OF CORRECTION

PATENT NO. : 6,917,902 B2
DATED : July 12, 2005
INVENTOR(S) : B. Alexander

It is certified that error appears in the above-identified patent and that said Letters Patent is hereby corrected as shown below:

Column 21,
Line 5, "profile a number" should read -- profile corresponds to a number --.

Signed and Sealed this

Seventh Day of February, 2006

JON W. DUDAS
*Director of the United States Patent and Trademark Office*